US012536811B1

(12) United States Patent
Pronovost

(10) Patent No.: US 12,536,811 B1
(45) Date of Patent: Jan. 27, 2026

(54) INFERRING STATE OF A TRAFFIC DIRECTING FEATURE

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 465 days.

(21) Appl. No.: 17/993,805

(22) Filed: Nov. 23, 2022

(51) Int. Cl.
*G06V 10/776* (2022.01)
*B60W 30/18* (2012.01)
*G06V 10/764* (2022.01)
*G06V 20/58* (2022.01)
*B60W 60/00* (2020.01)

(52) U.S. Cl.
CPC ..... *G06V 20/584* (2022.01); *B60W 30/18154* (2013.01); *G06V 10/764* (2022.01); *G06V 10/776* (2022.01); *B60W 60/001* (2020.02); *B60W 2555/60* (2020.02); *B60W 2720/10* (2013.01)

(58) Field of Classification Search
CPC .. G06V 20/584; G06V 10/776; G06V 10/764; B60W 30/18154; B60W 2555/60; B60W 60/001; B60W 2720/10
See application file for complete search history.

(56) References Cited

U.S. PATENT DOCUMENTS

2021/0316742 A1\* 10/2021 Hayes ................ G05B 19/0428
2024/0123996 A1\* 4/2024 Caesar ................ G08G 1/0133

FOREIGN PATENT DOCUMENTS

GB 2602630 A \* 7/2022 ............... G06K 9/00
WO WO 2021/218385 A1 \* 4/2021 ............... G06K 9/00

\* cited by examiner

*Primary Examiner* — David F Dunphy
(74) *Attorney, Agent, or Firm* — EIP US LLP

(57) ABSTRACT

Techniques are described herein for inferring a state of a traffic direction feature. The technique comprises using two detection models, wherein one detection model is trained to classify a state of the traffic direction feature based at least in part on imaging data, and wherein the second detection model is trained to classify whether traffic being allowed to travel along a route or not based at least in part on sensor data indicating a movement status of an object. By comparing the outputs of the two detection models, the state of the traffic direction feature may be inferred.

19 Claims, 6 Drawing Sheets

INFERRING STATE OF A TRAFFIC DIRECTING FEATURE

BACKGROUND

Traffic direction features such as traffic lights are signaling devices that can be located at, or near, road intersections, pedestrian crossings, rail crossings, and other locations to control a flow of traffic. Their signals can indicate whether it is permissible to travel along a particular route and can therefore help to improve safety on the road. Many traffic direction features comprise stop and go signals and may include additional signals relating to other control operations. Accurate detection and compliance with traffic direction features are important in the control of a road vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
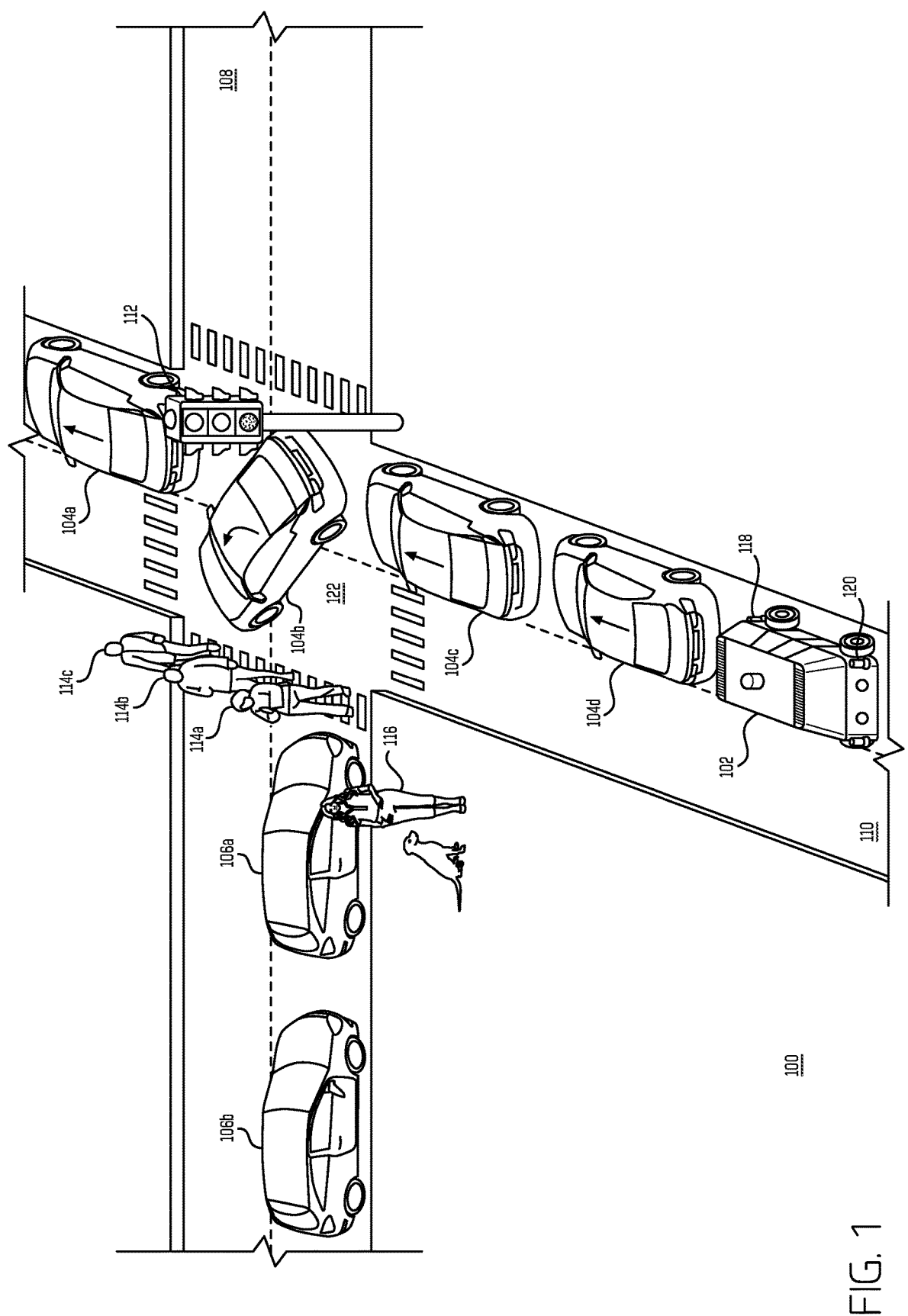
FIG. 1 is an example scenario including a vehicle.

This disclosure describes techniques that can be used to infer states of traffic lights and other traffic directing or routing features (such as digital traffic direction signs, temporary signs, traffic guards, traffic directing persons, etc.,) in a vehicle environment that can provide redundancy for an autonomous vehicle or otherwise be used to identify such features. Certain vehicles, such as fully or semi-autonomous vehicles, may use these techniques to infer traffic light states with no, or minimal, input from a driver. Classification of a state of the traffic direction feature can be done by such vehicles using a perception-based system which may use various sensors such as camera. In some cases, the statuses of traffic directing feature may be hard to detect using a perception system. For example, a traffic directing features may be (at least partially) occluded, beyond an effective identification range, or be poorly illuminated. In some examples, the perception system may be degraded due to glare from the sun, weathering conditions, damage to a sensory, etc. In these cases, and other cases, providing an alternative or additional system for classification of a state of a traffic routing feature is advantageous. Instead of or in addition to relying on sensor input (such as images of the traffic directing feature) directly indicating a state of a traffic light head or other traffic directing features, the disclosed techniques can rely on detecting movement patterns and other behaviors of objects in an environment in response to a traffic direction feature. For example, a red signal from a traffic light should result in that traffic on the road, or part of the road, which the red signal is valid for, stopping. Pedestrians may cross the road with a red signal for traffic on a pedestrian crossing. Bicycles may cross the road with a red signal for traffic on a bicycle crossing. Traffic moving on other roads of the junction may still enter the junction. Consequently, analyzing movement patterns and other behaviors of objects in an environment in response to a traffic direction feature may provide a reliable backup system for inferring a state of a traffic direction feature.

Both the perception based and the behavior-based system may be implemented by separate types of detection models (e.g., machine-learned (ML) models or heuristic models or a combination of them both). Using more than one model type for inferring signal status of a traffic light may also be used in an offline mode to improve training and assess quality of the respective detection models. For example, identifying cases where two machine learning (ML) models disagree on the signal status of the traffic light may provide edge cases to be included in the training data of one or both of the ML models, or to detect improperly labeled training data. Moreover, analyzing and comparing output from the detection models over time and for different scenarios may provide useful insights relating to quality, strengths, and potential areas of improvements of the detection models.

Certain vehicles, such as fully or semi-autonomous vehicles (AV), may employ techniques to detect and classify traffic direction features with no, or minimal, input from a driver. It is important for such vehicles to accurately determine which traffic routing features and states of these that are relevant to an intended direction of travel, their associated meaning, and to determine which of those states are currently active as a misclassified state of a traffic directing feature could lead to an unsafe situation. A vehicle may comprise one or more sensors or at least be associated with one or more sensors. For example, the one or more sensors may be distributed amongst several vehicles and/or located in proximity to the vehicle and/or traffic light. The sensor(s) may be configured to capture information relating to the state of the traffic directing feature. In examples, the sensor is a camera, and the information may be an image of a scene comprising a traffic light head. In other examples, the information may be captured by one or more other types of sensors such as a light detection and ranging (LIDAR) sensor, radar sensor, ultrasound sensor, infrared, etc. The information can be processed to classify the signal status of the traffic light according to the present disclosure.

As used herein, a "traffic directing feature" comprises at least one "state" indicative of a control command (go, stop, yield, etc.,) that is to be obeyed by traffic (vehicles) on the road (e.g., a light of a traffic light head selectively illuminated green, yellow, or red). Such control command is collectively herein referred to as a "state of the traffic directing feature" or similar. For traffic light heads, the "state" may be referred to as "signal status". A traffic directing feature may comprise both vehicular states (intended for vehicles moving on a road) and pedestrian states (intended for pedestrians or other entities that cross the road). A vehicular state can be selectively intended for a subcategory of vehicles, such as for busses or cycles. Examples of traffic directing features include traffic light heads, digital traffic signs, analog traffic signs, human traffic guards, etc.

A traffic directing feature may be associated with a junction. As used herein, a "junction" is where a road meets another road. The roads may be different types of roads, such as one road for cars and similar, meeting a railroad. Another example is where a road meets a bicycle road or a pedestrianized road. More than two roads may meet in a junction. The junction may be a T-junction, a Y-junction, a staggered junction, a crossroad, a roundabout or any other type of junction of roads. The roads typically cross at-grade but this disclosure may also apply to interchange junctions. A traffic routing feature may further be associated with a road not part of a junction, or a lane of such a road. For example, a traffic routing feature may inform traffic that "the right lane is closed".

In this disclosure, identification of a traffic directing feature will be discussed. For ease of description, many examples will relate to identification of a signal status of a traffic light head of a junction associated with a traffic light. However, as described above, the disclosure applies to all types of directing features where behavior of objects in the environment where the traffic directing feature is present may be used to identify the state of the traffic directing feature. Similarly, for ease of description, examples of the present disclosure include two separate ML models that can be used to classify a signal status of a traffic light head of a junction, one perception-based (first) model directly detecting a signal status of the traffic light head and one (second) model that analyze behavior of objects near the traffic light head and thus indirectly detects the signal status of the traffic light head. The second model is thus used as a backup system to the first model and comparison of the respective outputs may provide an improved accuracy of the classification of the state of the traffic directing feature. However, it should be noted that the detection model predicting a state of a traffic routing feature based on behavior of objects in an environment comprising the traffic directing feature may be used on its own, for example in the case when the perception-based model directly detecting a state of the traffic direction feature fails to identify the traffic direction feature and thus provides no output or classification.

The first (main) detection model may in examples takes image data such as one or more images, lidar data, or any other suitable sensor modality (or information derived from such images/data) of a traffic light head associated with a junction associated with a path of a vehicle as input and uses such information to infer a signal status of the traffic light. In examples, the image(s) may be captured by a camera of an AV moving on a road towards the junction. In other examples, the images can be received at such a vehicle from an external camera placed near the junction or may be received from historical data. The image or images may be processed before being input to the first detection model. For example, such processing may include identifying a potential changing signal status of the traffic light between subsequent images, such as a flashing traffic light. Other potential processing may include scaling, cropping, rotating, adjusting perspective or any other suitable adjustment or analysis of the image data. In some examples, several traffic light heads may be visible in the image data. In these examples, processing may include identifying which of the traffic light heads that is relevant to the road that the vehicle is moving on. It should be noted that the processing may in itself be implemented in a detection model.

The image data, or information derived from the image data, of the one or more images is input to the first detection model. In case the detection model is a ML model, the first ML model may be trained to classify a signal status of the traffic light head associated with the junction or to classify a state of a traffic directing feature detectable in the first input data. This may be done through a convolutional neural network (CNN) trained to classify training image data (or data derived therefrom) into a plurality of classes. Other types of ML models may be employed such as a multi-layer perceptron (MLP) network trained for the task. Training data may comprise manually labeled images/data. In other examples, training data may be gathered automatically by e.g., connecting to a traffic light head to access the correct label for an image depicting the traffic light head. The training data typically comprises image data (or data derived therefrom) from a plurality of different traffic lights, captured under different circumstances (distance, lighting conditions, angles, etc.,) with many examples of each possible signal status of traffic lights. Other possible detection models are expert models (based on heuristics) which may have been manually set up or a combination of ML model and a heuristic model.

In examples, the first detection model may be configured to output an indication of certainty relating to a classification made by the first detection model. For example, the indication of certainty may comprise a set of probabilities associated with the signals of the traffic light or a set of probabilities associated with the possible states of a traffic routing feature. Each probability may represent how certain the detection model is that an traffic routing feature is in a corresponding state (e.g., red/yellow/green/stop/yield/go). The indication of certainty may comprise such probability as a normalized value.

The signal status of the traffic light, as classified by the first ML model, may thus represent the active light type of the traffic light, such as red, yellow, green, flashing red, flashing green, arrows, color of arrows, etc. The classification may also involve identifying the traffic light status as "broken" or "faulty". The classification made by first the ML model may be associated with an identification of certainty relating to the probability of correctness of the classification, for example outputted by the first ML model.

As described above, a second detection model can be used as a backup system to the first model. The second detection model may be configured to classify a first class corresponding to traffic being allowed to travel along a route, and a second class corresponding to traffic not being allowed to travel along a route based at least in part on sensor data indicating a movement state of an object. In examples, such a classification may be made based at least in part on a time ordered sequence of sensor data relating to the movement state of the object during a time period. The second or different detection model may in examples be a ML model trained to classify a first class corresponding to traffic of a road, lane or direction of travel of a junction being allowed to enter said junction, and a second class corresponding to traffic of a road, lane or direction of travel of a junction not being allowed to enter said junction. Put another way, the second ML system may be trained to classify a first class corresponding to traffic of a road or lane of a junction being allowed travel along a route through said junction, and a second class corresponding to traffic of the road or lane of the junction not being allowed travel along the route through said junction. The classification of the second detection system may be done based at least in part on sensor data from sensors measuring movement states of objects separate from the vehicle, for examples cars, bicycles, pedestrians, busses, etc., that are located relatively close to the junction, such that their movement patterns should be influenced by the state of the traffic direction feature (such as a traffic light head). As mentioned above, the second detection model may be used for situations not involving a junction, for example where a lane of a road has been closed due to an accident or a construction site or for similar reasons. In examples, the second detection model may be configured to classify a first class corresponding to traffic being allowed to travel along a route, and a second class corresponding to traffic not being allowed to travel along a route.

As used herein, "movement state" refers to how much an object is moving and in what direction. The movement state may for example define a velocity of the object in an x-direction and a y-direction. Optionally, the movement state may further comprise an acceleration of the object in an x-direction and a y-direction.

As used herein, "traffic" refers the movement of objects moving in relation a part of a road controlled by a traffic directing feature, such in relation to a junction.

The sensor data may be captured by one or more sensors of the AV moving on a road towards the junction or along a route where movement patterns and other behaviors of objects in an environment is affected by a traffic direction feature. The sensor data may be captured by sensors external to the AV, for examples sensors positioned on streetlights or otherwise near the junction to analyze traffic behavior. The sensor data may also be from historical data.

In the process of determining input data to the second ML model, the sensor data may be processed, for example to identify types of objects (car, bicycle, pedestrian, bus, etc.,) and their respective motion vector. The sensor data may be complemented by other types of data, such as map data to e.g., identify which objects are closest to the junction or to give each identified object a coordinate relating to some known representation of the environment in which the objects move, such as a frame of reference.

In examples, the input data to the second detection model can correspond to a top-down view of at least part of an environment around a vehicle. In examples, for example relating to a real time application of inferring traffic light status by an AV, the top-down view can be a representation of an environment being traversed by the AV. In offline examples, using historical data from e.g., driving logs to determine the input data, the top-down view can represent the environment in which the historical data was captured by one or more sensors. The top-down view may be a multi-channel image. Each channel may represent different features of the environment. For example, channels may represent, but are not limited to, one or more of: road network information (e.g., semantic labels indicating lanes, crosswalks, stop lines, lane dividers, stop signs, intersections, traffic lights, and the like), type of an object in the environment (vehicle, pedestrian, etc.,) a bounding box associated with an object, a velocity of the object in an x-direction and a y-direction, an acceleration of the object in an x-direction and a y-direction, a blinker status of the object (e.g., left-turn, right-turn, braking, reverse, hazards, no lights, etc.), and the like. In some examples, the number of channels may be reduced into fewer channels. As a non-limiting example, a simple 3-channel (e.g., RGB) image may be used to represent multiple pieces of semantic information. In such an example, a red channel, for instance, may be used to denote a bounding box and the intensity of the red value may be associated with a velocity, acceleration, or the like. Further in such an example, a second channel may encode lane width with intensity indicative of a speed limit, and the like.

The top-down view may be used as input into the second detection model being a ML model which is trained to classify a first class corresponding to traffic of a road (i.e., the road which the traffic direction feature is associated with), direction of travel, or lane being allowed to enter a junction, and a second class corresponding to traffic of that road, direction of travel or lane not being allowed to enter a junction. The second ML model may be implemented using a CNN which may include one or more recurrent neural network (RNN) layers, such as, but not limited to, long short-term memory (LSTM) layers. Other machine learning architectures designed to process sequential input data, such as transformers, may be employed.

In some examples, the input data to the second ML model corresponds to a graph representation of at least part of an environment around the junction. The graph representation may also be referred to as a vectorized representation. In examples, for example relating to a real time application of inferring traffic light status by an AV, the graph representation is a representation of an environment being traversed by the AV. In offline examples, using historical data such as driving logs to determine the input data, the graph representation represents the environment in which the historical data was captured by one or more sensors. In some examples, the techniques may include determining and vectorizing elements of an environment from a feature map associated with the environment, as well as objects perceived in the environment. In examples, the vectorized environment elements and objects are represented within a graph structure. In examples, the second ML model comprises a graph neural network (GNN) that includes object nodes. The GNN also may include an edge network storing offset data (e.g., relative positions, relative poses, relative speeds, relative accelerations, relative sizes, etc.) between pairs of objects in the GNN. A GNN is a type of neural network which may operate on a graph structure.

The sensor data from which input data to the second detection model is determined may be captured by a sensor associated with a vehicle (e.g., a vehicle driving along a route affected by a traffic direction feature such as on a road towards a road junction with a direction of travel having an associated traffic light head) in an environment. In some examples, the environment may include one or more objects separate from the vehicle, such as, for example, a first object (e.g., an entity). The sensor data may be processed in various ways to determine features associated with the vehicle, the first object, and/or the environment. For example, data may be determined representing a state of an object in the environment, such as the movement status. In some examples, the state may include, but is not limited to, a pose of the object, a position of the object, an acceleration of the object, a speed of the object, a size of the object, a type of the object, a lighting state of the object, and the like. Such features may thus form basis for the second ML model analyzing object behaviors and classify a signal status of the traffic light of the junction in question.

Independent on what type of architecture the second detection model implements, in case the second detection model is a ML model, it may be trained using training data (top down view, or vectorized, or any other suitable data format than can represent object behavior in an environment around a junction, road, direction of travel or lane associated with a traffic light head). The training data should advantageously include a variety of object behaviors for different types of situations and labeled according to the state of the traffic direction feature controlling traffic flow along a route. In some embodiment, the second ML model is classifying whether traffic is allowed to enter a junction or not, wherein the road of the junction for which the classification is valid is predefined in the input data.

Similar to the first ML model, in examples, the second ML model may be trained to output an indication of certainty relating to a classification made by the second ML model. For example, the indication of certainty may comprise a set of probabilities associated with the possible classifications from the second ML model, where each probability may represent how certain the ML model is that traffic is allowed to travel along a route or not. In other examples, the indication of certainty may comprise only the probability associated with the class that the input data was classified as. The indication of certainty may comprise such probability as a normalized value.

The output from the two detection models may be compared to infer (deduce, conclude, etc.,) the state of the traffic directing feature. In examples, the outputs are compared to determine if the classifications between the first detection model and the second detection model agrees or disagrees. For example, corresponding (agreeing) output classifications such as the signal status of the traffic light head being green, and the traffic being allowed to enter the junction, may increase the probability that the ML models have inferred a correct signal status of the traffic light. Such a conclusion may result in the AV being controlled according to a planned trajectory of the AV, for example turning left in the junction. Similarly, corresponding output classifications such as the signal status of the traffic light head being red, and traffic not being allowed to enter the junction may result in that AV being stopped to wait for a changed signal status of the traffic light head to continue through the junction.

In some examples, the first detection model does not output any classification, for example because it cannot detect/identify any traffic direction feature in its input data and as such cannot classify a state of the traffic direction feature. This may be the case for example when the traffic direction feature is occluded, or when the weather conditions make detection of the traffic direction feature difficult. In these examples, the second detection model may still classify, based on behavior of objects, that traffic may not be allowed to travel along a particular route. Consequently, in some examples, an activity such as controlling a vehicle may be performed based at least in part on the output of the second detection model, even though the first detection model does not output any classifications.

In examples, differing classifications (i.e., the first and second detection model disagrees) wherein the first ML model is trained to output an indication of certainty relating to a classification made by the first ML model, and the second ML model is trained to output an indication of certainty relating to a classification made by the second ML model, may result in the classification from the ML model with the highest indication of certainty being prioritized when inferring a state of the traffic direction feature. Put differently, a classification related to a higher certainty score may be prioritized over a classification related to a comparably lower certainty score when comparing the output of the first detection model with the output of the second detection model.

In examples, if there are differing classifications (i.e., the first and second detection model disagrees) and a classification for example indicates that the signal status of a traffic light is red (stop), that classification is prioritized when inferring a signal status of the traffic light. For example, if the output from the first detection model is that the signal status of the traffic light head is red, and the output from the second detection model is that traffic of the road, direction of travel or lane is allowed to enter the junction, the red light classification is prioritized. Similarly, if the output from the first detection model is that the signal status of the traffic light head is green, and the output from the second detection model is that traffic of the road, direction of travel or lane is not allowed to enter the junction, the latter classification is prioritized.

In examples, the first and second detection models may perform differently under different environmental conditions. For example, the respective input data may be less suitable to infer a correct signal status of the traffic light under certain weather conditions (i.e., when the sensor data is sensed and/or the images is captured). In these examples, an indication of reliability of the outputs from the first and second detection models may be determined. The indication of reliability may be determined from a look up table where different weather conditions (or other conditions of the environment while collecting data to be analyzed) are mapped to different reliabilities. The indication of reliability can be determined through heuristics where rules are based on the different weather conditions or other conditions of the environment while collecting data to be analyzed. The indication of reliability may be determined via a separate detection model trained to classify reliability of the detection models for different input environmental conditions.

The indications of reliability may be used to prioritize among two disagreeing outputs from the detection models. For example, when the indication of reliability of the first detection model is higher than the indication of reliability of the second detection model, a classification of the first detection model is prioritized over a classification of the second detection model, and vice versa. Put differently, an output from a detection model determined to have a higher reliability score may be prioritized over an output from a ML model determined to have a comparably lower reliability score when generating the instructions.

In examples, when the output from the first and second detection models disagree, at least one of the following may be used to determine which of the outputs that should be prioritized over the other:

"Severeness" or "importance" of the classification. For example, red/stop may be considered more severe or important to consider compared to green/go.

Indication of certainty relating to a classification from a ML model.

Indication of reliability of a detection model under certain environmental conditions One or more of these three considerations may be used to weight a respective classification to prioritize one over the other when prioritizing among two disagreeing classifications.

In examples, disagreeing classifications (e.g., a difference between the classifications exceeds a threshold) may cause instructions to be generated to control a vehicle (e.g., the AV), that comprise one of: stop the vehicle, slow down the vehicle, and dispatch a request for human intervention to control the vehicle. In some examples, remote human user control of the AV, or control from a human travelling in the AV may be advantageous to handle disagreeing classifications.

In some examples, controlling the AV in a situation where classifications disagree may be based on distance from the AV to the junction. If the distance exceeds a threshold distance, it may be advantageous to slow down the vehicle to give more time and opportunities for the first and second ML to come to an agreeing conclusion of the signal status of the traffic light. If the distance is less or equal to the threshold distance, it may be advantageous to stop the vehicle or dispatch a request for human intervention to control the vehicle. The threshold may vary based on a speed of the AV and or the environmental conditions. The threshold may be expressed as a multiple of a standard vehicle stopping distance at a particular speed and/or particular environmental conditions.

In some examples, the first and second detection model classifies based on historical data. This may be referred to herein as "offline mode" while a real time application wherein the first and second detection systems classify based on real time input data (based at least in part on images and other sensor data gathered in [near] "real time") may be referred to herein as "online mode".

In an offline mode, the data on which the input to the first and second detection model is based on may be extracted/fetched from one or more logfiles or driving logs. Such log files may be created while a vehicle (AV) is operated ("online") and may store data from sensors of the AV, as well as other information about the operations of the AV and details about circumstances while it was operated.

In an offline mode, comparison of outputs from the first and second detection model may be used to evaluate the models and/or to extract training data to improve the models.

In examples, a quality metric of the first detection model and/or the second detection model may be updated based on the comparison. As used herein, a "quality metric" refers to an indication of an expected correctness of the output of any of the ML models, wherein the expected correctness is not only based on the training data for the respective models but also on the above discussed comparison of the outputs. Since the detection models, in the optimal situation, should output agreeing classifications most of the times (unless for example traffic does not obey the signals from the traffic light), a comparison between the outputs may advantageously be used for continuous assessment of the models. For example, if the output from the second detection model changes (e.g., allowed, not allowed, allowed . . . ) while the output from the first detection model stays the same (e.g., red or green), this may indicate that the quality of the second ML model is less than expected. Specific situation or environmental condition may be mapped to different quality metrics and updated accordingly, such as for example the above mentioned flickering behavior of the second detection model being noticed in data gathered while lighting conditions are low in the environment, or when it is raining, etc.

In examples, such quality metric may be used when determining the indication of reliability as exemplified above.

In examples, in an offline mode, disagreeing classifications may be used to identify data suitable to use to improve training of respective detection model (e.g., when being implemented as ML models). For example, in case the second ML model classifies a certain situation as "allow traffic to enter junction" (possibly with a high degree of probability/certainty) while the first ML model classifies same situation as "red", the image/images which the input data to the first ML model was determined from may be marked for human labeling. The image/images (or data derived therefrom) may then (possibly after being verified as suitable by a human) be included among the training data for the first ML model. In this way, an automatic or at least semi-automatic way of finding edge cases to be included as training data may be achieved. Similarly, sensor data from the sensor which the input data to the second ML model is based may be marked for human labeling in some cases where the output from the first and second ML model disagrees. In examples, both the image/images and the sensor data may be marked for human labeling in cases where the output from the first and second ML model disagrees, whereby a human may verify which of the outputs was correct and include the data used by the ML model that was wrong among the training data of that model.

FIG. 1 illustrates an example scenario 100 including a vehicle 102. The vehicle 102 may be an autonomous vehicle (AV). The vehicle 102 will hereinafter be referred to as the AV to separate the vehicle 102 from other vehicles 104a-d, 106a-b present in the scenario 100. The AV 102 may include a vehicle computing device and may be part of a vehicle system (not shown) that includes one or more remote computing devices. The example scenario 100 involves the AV 102 using a sensor 118—positioned on a front side of the AV and facing a forward direction of travel—to sense a traffic light head 112 associated with a junction 122. The traffic light head 112 is part of a traffic light that may have several other heads, e.g., for controlling other roads or lanes of roads. The AV 102 is moving towards the junction 122 on a road 110. The road 110 may have one or more lanes in each direction or may be a road without lanes. In the case of the road 110 having one or more lanes in the direction towards the junction, the traffic light head 112 may be setup to control traffic flow for one or more of such lanes. In FIG. 1, the junction 122 is a crossroad junction between the road 110 and another road 108.

In FIG. 1, the sensor 118 is a camera. Images obtained from the camera 118 may be used, at least in part, to control the AV 102. For example, the images may be used to determine whether the AV 102 should stop at the junction 122 or can proceed to travel through the junction 122.

In the example scenario 102, the AV 102 is moving towards the junction 122 which is controlled by the traffic light head 112. To properly control the AV 102 in an autonomous and safe fashion, it is important to correctly classify the signal status of the traffic light head 102. The signal status may be inferred by analyzing the traffic light head 112 directly, i.e., identifying which of the signals that is active at the moment. The signal status of the traffic light head 112 may also be inferred by analyzing traffic flow and movement patterns of movable objects in the vicinity of the junction 122.

In the following, usage of two separate ML models (not shown) for inferring a signal status of the traffic light head 112 will be described. A first ML model represents a perception-based system, that is utilizing sensor data (in this case a camera 118, but could be lidar, radar, etc.) for detecting the traffic light head 112 and classifying the signal status of the traffic light head 112. In other words, identifying which light signal of the traffic light head is active. The second ML model is a prediction system, which in this case predicts future actions for movable objects (traffic, pedestrians) identified via one or more sensor 120. The predicted movements of the detected objects may then be used to classify if traffic of the road 110 is allowed to enter the junction 122 or not, or is allowed to enter the junction for a particular direction of travel through the junction.

In FIG. 1, the positions of the camera 118 and the sensor 120 are by way of example. The camera 118 may generally capture images in a main driving direction of the AV 102 but may be located at any suitable position on the AV 102. The sensor(s) 120 for sensing objects and their movement states may similarly be positioned at any suitable place or places on the AV, as will be further described below in conjunction with FIG. 5.

For ease of description, it will be assumed that the computing device of the AV 102 determines input data for the ML models, runs the ML models, and uses outputs from two ML models for controlling operations of the AV. However, it should be noted that parts of one or both ML model, or an entire ML model may be run on the above mentioned remote computing devices. It is equally possible that parts or all usage of the outputs of the ML models for controlling the AV 102 may be done at the remote computing devices.

The camera 118 captures one or more images of the junction 122. The choice of using one or more images of the junction may be based upon requirements such as speed, noise level, types of signals that the traffic light head can activate, etc. For example, producing a combined image from a plurality of images may be suitable in case different parts of the traffic light head 112 are occluded over the plurality of images. In other examples, producing an average image from a plurality of images may be suitable in case the noise level of the images is high, to reduce noise features in the images. In yet other examples, detecting a flashing light from the traffic light head 112 may require a plurality of images to be captured. Other processing functionalities may be applied to the one or more images in the process of determining first input data from the one or more images.

The first input data is then input to the first ML model trained to classify a signal status of the traffic light head 112. The output of the first ML model may be classifications of the color of the active light signal like "red", "yellow", "green", indications of a type of objects that are allowed to enter the junction, like "all", "bus", "pedestrian", "bicycle", "none", indication of which lanes where traffic is allowed to enter the junction, like "all", "left", "right", "none", indications which trajectories/routes are allowed for traffic through the junction, like "all", "turn left", "turn right", "straight", "none", or a combination of any of the above.

The camera 118 may be any suitable type of camera for detecting signal status of a traffic light head 112, such as a visible light, red-green-blue (RGB) or infrared (IR) camera. More than one camera 118 may be employed to capture the one or more images.

To provide redundancy to the first ML model, behavior of moving objects in the vicinity of the junction 122 may be predicted to infer a signal status of the traffic light head 112. For this reason, sensor data from a sensor 120 of the AV 102 may be used. In the following, the sensor 120 is described as one sensor, but it should be noted that a plurality of sensors may be employed for this purpose.

The sensor 120 may be any suitable sensor, or combination of sensors, capable of identifying a movement state of a sensed object, for example a LIDAR sensor, a RADAR sensor, time of flight camera etc. In examples, the sensor 120 includes a sensor of a type from which signals can bounce on surfaces, e.g., to sense objects that otherwise would be hidden behind other objects.

From the sensor data, second input data suitable for a second ML model may be determined. Sensor data from a plurality of sensors 120 may be combined to form the second input data. Sensor data from the sensor 120 may be filtered to otherwise processed before forming the second input data. Sensor data may be combined with or complemented by other types of data such as maps to give each sensed object a location according to a defined coordinate system. The location of the AV 102 (and thus the sensor 120) may be known in that coordinate system and provide an anchor point to determine identified objects position the same coordinate system. Moreover, combining the sensor data with map data may provide context for the objects, e.g., are they moving on a road, are they stand still by a road crossing, are they stand still at the junction 122, are they turning from one road into another, etc.

In the scenario 100 of FIG. 1, four other vehicles 104 a-d are present on the same (first) road 110 as the AV 102. Three vehicles 104a, 104b, 104d are moving in a forward direction while one vehicle 104c is turning left in the junction. Two vehicles 104c-d furthest away from the AV 102 have entered the junction 122, while two vehicles 104a-b closest to the AV 102 have not yet entered the junction 122. In the other (second) road 108 of the junction 122, two vehicles 106a-b are stopped (not moving or standing still) and have not entered the junction 122. The scenario 100 further comprises four pedestrians 114a-c, 116. Three pedestrians 114a-c are moving in the scenario 100, walking on a crosswalk over the second road 108. One pedestrian 116 is standing still near a crosswalk over the first road 110.

At least one of the vehicles 104a-d, 106a-b and the pedestrians 114a-c, 116 may be sensed by the sensor 120 of the AV 102, together with a respective movement state of the sensed object. The sensor 120 may thus provide sensor data that may be used for identifying objects in a sensing range from the AV 102, together with a velocity of each object in an x-direction and a y-direction, and possibly also an acceleration of each object in an x-direction and a y-direction.

From the sensor data, second input data for the second ML model is determined. The second input data is input to the second ML model that is trained to classify a first class corresponding to traffic of the road 110 being allowed to enter the junction 122, and a second class corresponding to traffic of the road 110 not being allowed to enter the junction 122. In case of multiple lanes in the road, the classification may relate to a specific lane, e.g., the lane of the road that the AV 102 is driving on.

In the scenario of FIG. 1, the classification from the second ML model may come back as "traffic being allowed", according to the movement patterns of the objects as discussed above.

To infer the signal status of the traffic light head 112, a comparison is made between the output of the first ML model and the second ML model. This comparison may be made by the vehicle computing device or on a remote computing device. Based on the comparison, an operation of the AV 102 is determined and performed. For example, in the case its determined that the AV 102 may enter the junction 122, the AV 102 may continue along the planned route or trajectory.

In examples, the AV 102 comprises more sensors, for example environment sensors such as temperature sensors, humidity sensors, light sensors, pressure sensors, etc. Data from these sensors may be used to determine how reliable the outputs from the two ML models are. In some examples, the first ML model may be less reliable in a foggy lighting condition or in a very bright lighting condition because it may be more difficult to identify the traffic light head 122 and its signals in such conditions. In some examples, the second ML model may be less reliable under other environmental conditions (i.e., conditions of an environment being traversed by the AV 102). Providing redundancy when it comes to identifying a signal status of the traffic light head 112 may mitigate problems that certain sensor technologies may experience under certain weather conditions or other conditions of the environment. A rule-based system (heuristics) or a separate ML system may be employed to determining a first indication of reliability of the output of the first ML model and a second indication of reliability of the output of the second ML model based at least in part on conditions of an environment being traversed by the AV 102, and control the operation of the AV 102 accordingly.

Figure 2:
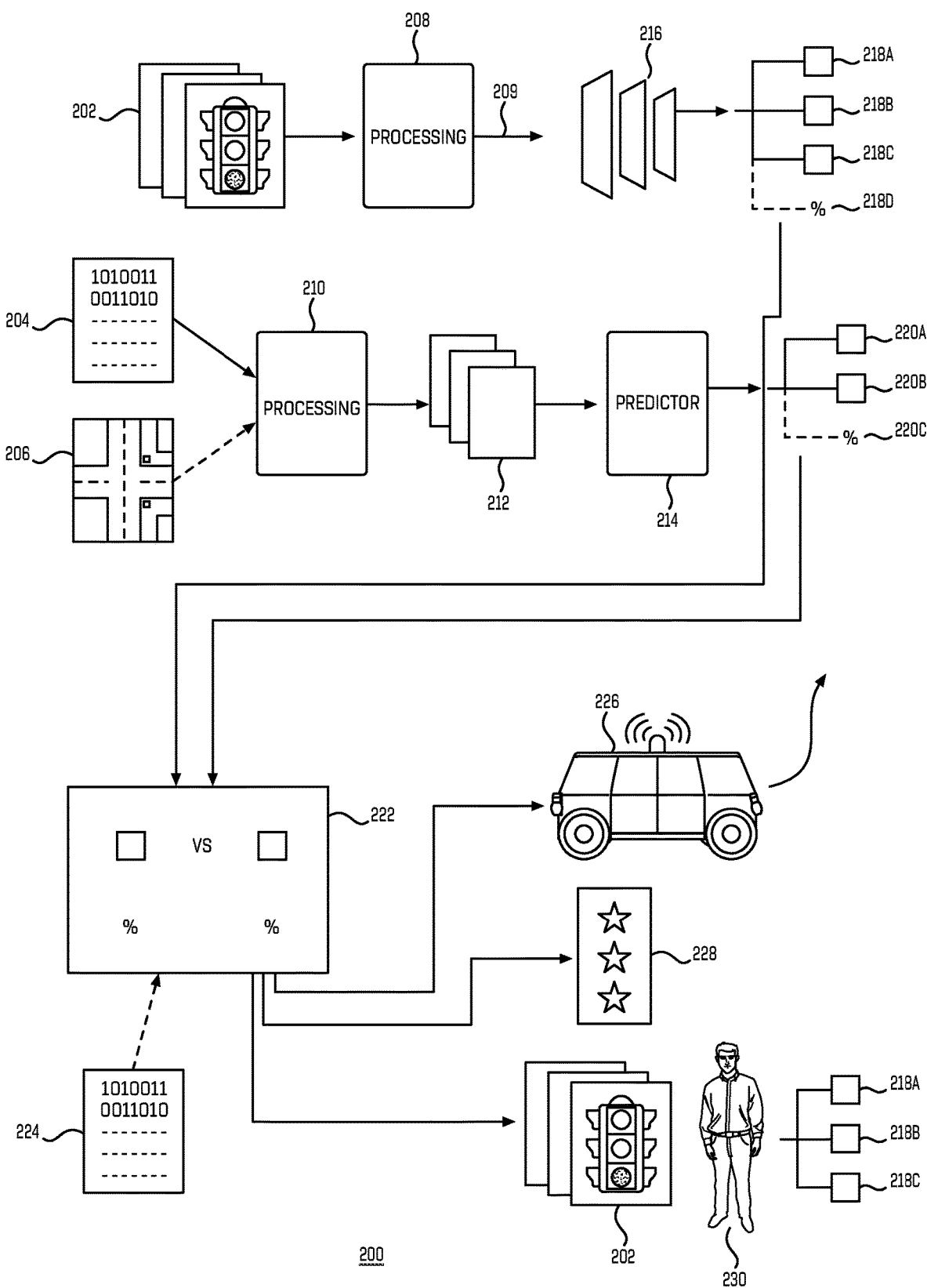
FIG. 2 depicts an example scenario of outcomes of a comparison between two machine learning models.

FIG. 2 depicts an example scenario 200 of outcomes of a comparison 222 between two machine learning models 214, 216. In this scenario 200, one or more images 202 including a traffic light head are captured. As mentioned above, a traffic light head is just an example of a traffic direction feature. Via a first processing stage 208, first input data 209 is determined based at least in part on the one or more images 202. The first processing stage 208 may involve preparing the images to be input a first ML model 216, for example removing headers from image data, extracting the raw pixel data, reorganizing the pixel data, scaling images, converting images from one format to another, etc. In some examples, the first processing stage 208 does nothing and just forwards the images 202 as is for input to the first ML model 216.

The first input data 209 is inputted to the first ML model 216. In this case, the first ML model is a Convolutional Neural Network (CNN) 216. CNNs are typically used to process image data due to their ability to resolve, identify and classify spatial features. The CNN may include any suitable number of layers, including an input layer, hidden layers, and an output layer.

The first ML model 216 is trained to classify a signal status from e.g., image data depicting a traffic light head. This means that images (processed according to the processing stage 208) of traffic light heads having different signal status have been labeled and provided for training as ground truth data, such that the first ML model 216 has been trained to classify a signal status of different traffic light heads.

The output of the first ML model 216 is thus a classification of the signal status of the traffic light head depicted in the images 202. The classification may include different signal status 218A-C and may also provide indication of certainty 218D relating to the classification, e.g., how likely it is that the classification is correct.

Moreover, in the example scenario 200, sensor data 204 indicating a movement status (e.g., a velocity vector or similar) of an object (vehicle, pedestrian, and the like) is received at a second processing stage 210. In examples, the sensor data comprises movement status of a plurality of such objects. In some examples, the sensor data 204 comprises a time ordered sequence of sensor data relating to the movement state of the object/objects during a time period such as 1, 2, 5, 10 seconds or other suitable lengths of time periods.

Map data 206 may also be received at the second processing stage. The map data 206 may include data representing various map features (or map elements) within the environment of the autonomous vehicle, including but not limited to roads, lanes, curbs, shoulders, crosswalks, buildings, trees, medians, street signs, traffic signals, speed limits, etc. In some cases, the map data may depict these and other types of permanent or semi-permanent map elements (e.g., road closures, road damage, construction sites, accidents, etc.), but might not include impermanent objects such other vehicles, bicycles, and pedestrians in the environment. In examples, the disclosed techniques may be beneficial when map data is incomplete or incompatible with an environment (e.g., because there is a temporary change to an environment's configuration due to construction or other temporary features). The disclosed techniques may thus be used to supplement systems that rely upon map data to define locations or characteristics of traffic directing features by analyzing traffic patterns associated with an environment that may not align with traffic indicated by the map data (e.g., there may be different lanes, closed lanes, different traffic directing features, etc.).

Based at least in part on the sensor data 204 and possibly the map data 206, second input data 212 is determined at the second processing stage 210. In the example of FIG. 2, the second input data 212 corresponds to a top-down view 212 of environment being traversed by a vehicle (such as the AV 202 in FIG. 1) while collecting the sensor data 204, the one or more images 202 is also captured at a same or similar point in time by the vehicle.

Using the sensor data and the map data, a multi-layer image 212 may be generated which represents the environment from a top-down perspective. The image may include semantic information of the environment and/or the objects therein. With respect to the objects, the semantic information may comprise a bounding box having extents, movement information associated with the bounding box (e.g., velocity, acceleration, etc.), classification information (whether the box represents a vehicle, pedestrian, bicyclist, motorcyclist, etc.). With respect to the environment, the image may comprise semantic information indicative of speed limits, lane widths, lane ends, stop lines, junctions and the like.

A plurality of images may be generated representing the environment over time. The image 212 or the plurality of images can be input into a prediction system 214 (e.g., the second ML model 214) trained to classify a first class corresponding to traffic being allowed to enter a junction, and a second class corresponding to traffic not being allowed to enter a junction. The second ML model may be trained to predict trajectories for the objects and based on this predict whether traffic is allowed to enter a junction or not.

In some cases, the image 212 to be input into the prediction system 214 can be represented by individual channels of a multichannel image where each channel represents different information about the object and the environment in which the object is located.

In some embodiments, the prediction system 214 is a two-stage prediction system where the first stage outputs a heat map comprising prediction probabilities associated with possible locations of the objects in the future. The second stage may then take this heat maps as input and predict whether traffic is allowed to enter a junction or not.

In some examples, the image 212 comprises one or more channels identifying a movement pattern of the objects, for example during a period of time preceding a current point in time, and the prediction system may be trained to classify a first class corresponding to traffic being allowed to enter a junction, and a second class corresponding to traffic not being allowed to enter a junction based on map data and movement patterns, etc. Examples of the period of time may include 1 second, 1.5 seconds, 5 seconds, 10 seconds, etc.

Examples of how to determine the second input data 212 (i.e., the multi-layer top down view 212 of the environment) is described in U.S. application Ser. No. 16/151,607 (titled "Trajectory prediction on top-down scenes" and filed Oct. 4, 2018) which is incorporated herein by reference in its entirety for all purposes. The same application also describes examples of how to predict heat maps comprising prediction probabilities associated with possible locations of the objects in the future.

The second ML model 214 may be trained using historical sensor data labeled with a correct signal status of a traffic light head (i.e., state of the applicable traffic directing feature). In the two-stage embodiment above, the second stage ML model may be trained using heat maps produced by the first stage ML and labeled with a correct signal status of a traffic light head.

The output of the second ML model 214 is thus a classification 220A-B whether traffic being allowed to enter a junction or not (i.e., being allowed to travel along a route or not). The ML model may also provide indication of certainty 220C relating to the classification, e.g., how likely it is that the classification is correct.

The next stage of the example scenario 200 of FIG. 2 is a comparison stage 222 where the output 218A-D from the first ML model 216 and the output 220A-C of the second ML model 214 is compared. In some examples, where indications of certainty 220C, 218D are provided, the comparison stage 222 may take such input into consideration while performing the comparison. Further data may be used to weight the respective classifications in the comparison, for example data 224 relating to conditions of the environment at the time of capturing the images 202 and sensing the sensor data 204. Such data may, as exemplified above, be used to determine an indication of reliability of the output of the first ML model and the second ML model. As mentioned above, in some examples the first ML model 216 does not output a classification while the second ML model 214 does output a classification. In these examples, the comparison stage 222 would merely use the classification from the second ML model and perform an activity at least partly based on that (e.g., controlling a vehicle).

Based at least in part on the comparison, different outcomes are envisaged. In examples, instructions to control a vehicle 226 (such as the AV 102 of FIG. 1) are generated. Such instructions may be used to determine a trajectory for the vehicle 226 to follow.

In other examples, in the case that the output (classification 218A-C) of the first ML model 216 disagrees with the output (classification 220A-B) of the second ML model 214, the one or more images 202 may be marked to be labeled 218A-C by a human 230. In examples where indications of certainty 218D, 220C are provided, images may be marked for human labeling in case one or both meet or exceed a threshold. In examples where data 224 is provided, images may be marked for human labeling in case conditions of the environment meets a requirement.

In examples, the outcome of the comparison may be used to update a quality metric 228 relating to one or both of the ML models 214, 216. Advantageously, in this example, quality of the ML models 214, 216 may be measured not only using labeled data, but also while the ML models 214, 216 being used, since in a perfect case, they should nearly always provide agreeing outputs.

Figure 3:
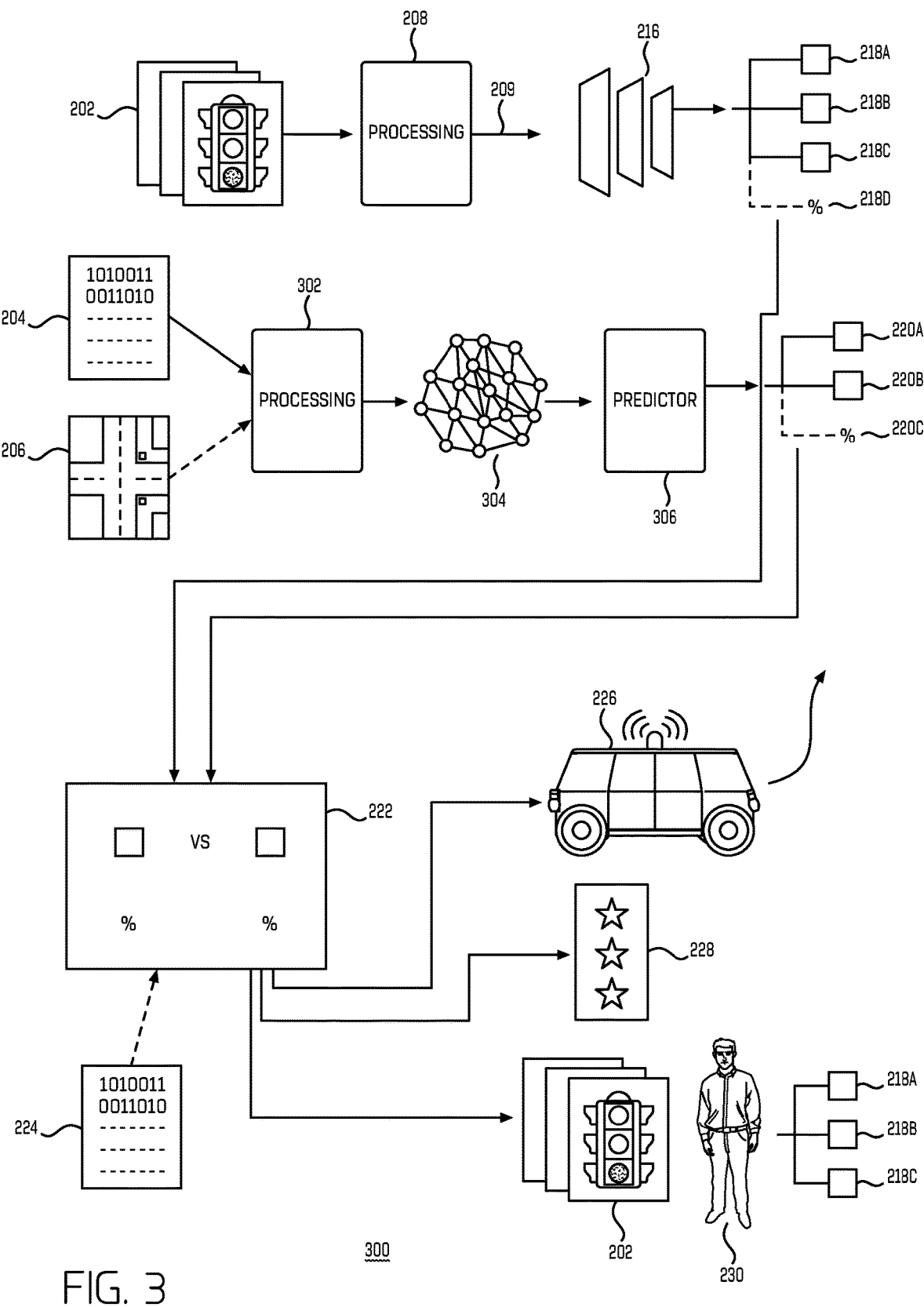
FIG. 3 depicts another example scenario of outcomes of a comparison between two machine learning models.

FIG. 3 depicts an example scenario 300 of outcomes of a comparison 222 between two machine learning models 216, 306. The example scenario 300 is nearly identical to the example scenario 200 of FIG. 2, and the description of relevant parts of FIG. 2 applies mutatis mutandis to FIG. 3.

The difference between example scenario 200 and example scenario 300 relates to the second ML model and the content of the input data thereto. In FIG. 3, the second input data 304 is a graph representation of an environment. Techniques may be used that include determining and graph elements of an environment from a feature map associated with the environment (e.g., based at least in part on map data 206), as well as objects perceived in the environment (e.g., based at least in part on sensor data 204) and representing the vectorized environment elements and objects within a graph structure 304. The graph structure 304 may be input to a Graph Neural Network (GNN), which is a neural network that may operate on graph structures. Data output by the GNN may represent a distribution of predicted future states of individual objects in the environment, such as predicted position and predicted velocity. A predictor 306 may comprise the GNN and may use its output to classify (predict) whether traffic being allowed to enter a junction of the environment or not.

In examples, based on the sensor data 204 (which may comprise LIDAR data, radar data, sonar data, time-of-flight data, or other depth data), features of an object identified in the sensor data 204 is determined. The object features (also referred to as node state in the GNN) may involve a movement status of the object and other states. In other words, the feature may include, but is not limited to, a pose of the object, a position of the object, an acceleration of the object, a speed of the object, a size of the object, a type of the object, a lighting state of the object, and the like.

Environmental features may also be determined. For example, the sensor data 204 and/or map data 206 may be processed to determine a feature map representing the environment, and the environmental feature may be determined based on a current position of the object in the environment and a corresponding position on the feature map, where the environmental feature may be extracted from the feature map at the current position of the object, providing scene context features relative to the position of the object.

Based at least in part on the object features and the environmental features, nodes of the GNN may be determined. Edges between nodes represent how the nodes relate to each other (or relative data between two nodes), for example representing relative positions, velocity, pose, size etc., between objects.

An inference operation may be performed on the GNN to update the node states and/or edge features of the GNN. The inference operations may use machine learning techniques (e.g., trained based on driving logs and/or other training data) to determine a predicted future state of the GNN based on the current state of the GNN. The predicted future state of the GNN may correspond to updated object positions, velocities, trajectories, intents, and/or interactions that may occur between objects in the environment. Based at least in part on the predicted future state of the GNN, the predictor 306 may classify whether traffic being allowed to enter a junction or not.

Examples of how to determine the second input data 304 (i.e., graph structure) and update a GNN building on that graph structure is described in U.S. application Ser. No. 17/535,357 (titled "Encoding relative object information into node edge features" and filed Nov. 24, 2021 which is incorporated herein by reference in its entirety for all purposes.

Figure 4A:
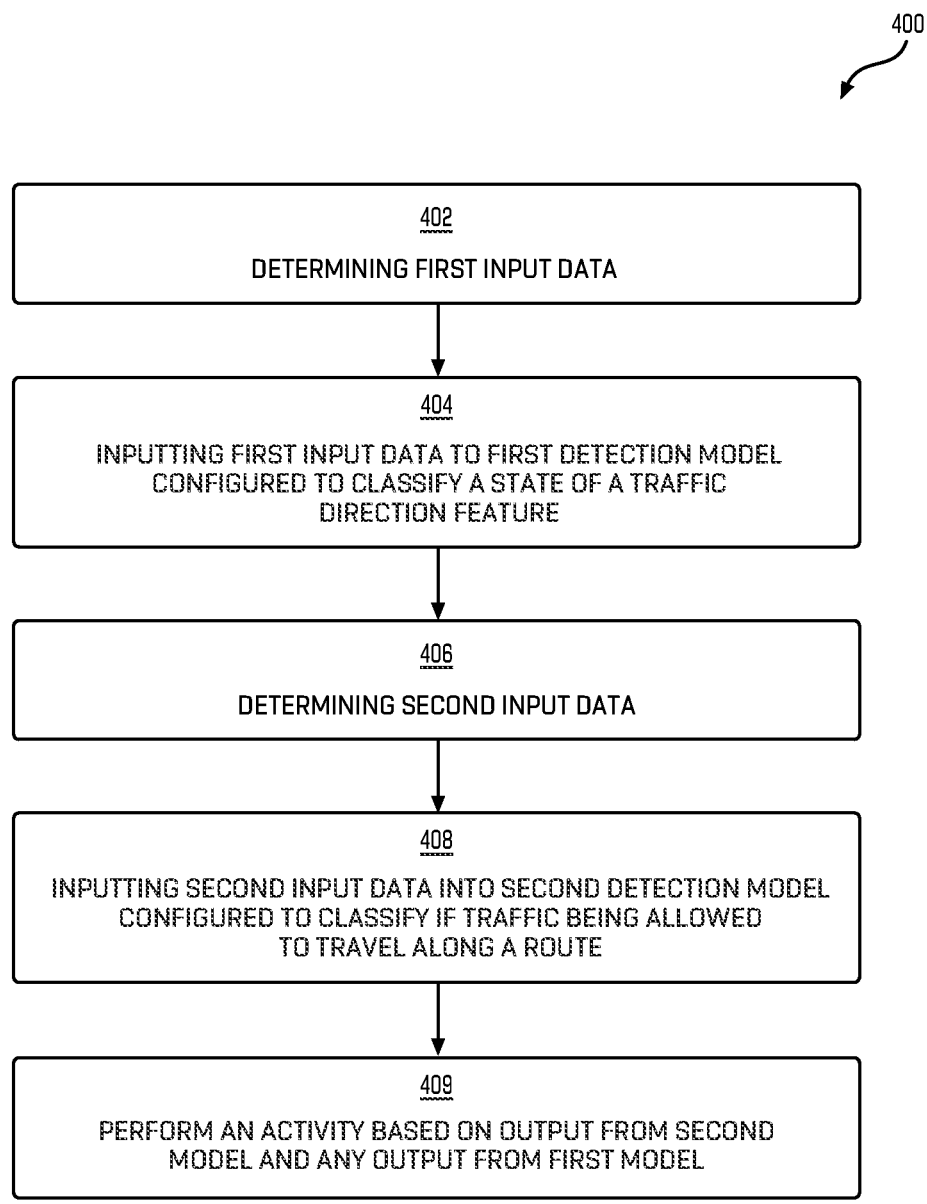
FIGS. 4a and 4b depict flow charts of example traffic light classification processes.

FIG. 4a depicts a flow chart of an example traffic direction classification process 401. The process may be embodied by a computer-implemented method, or as instructions stored by one or more non-transitory computer-readable media, wherein the instructions, when executed, cause one or more processors to perform operations as exemplified in FIG. 4a.

The process 400 comprises determining 402 first input data from image data, for example an image of a traffic direction feature such as traffic light head associated with a junction. The process 400 further comprises inputting 404 the first input data into a first detection model configured to classify a state of a traffic directing feature detectable in the first input data. As such, in case the imagining data does not comprise a traffic direction feature, or if the first detection model cannot detect such traffic direction feature in the first input data, the first detection model may not output any classification, or output a classification corresponding to "no traffic directing feature detected". However, if the imaging data comprises a traffic direction feature, the first model may classify the state of such feature as described above.

The process 400 comprises determining 406 second input data based at least in part on first sensor data from a first sensor, the first sensor data indicating a movement status of an object. The process 400 comprises inputting 408 the second input data into a second detection model trained to classify a first class corresponding to traffic being allowed to travel along a route, and a second class corresponding to not being allowed to travel along the route.

The process 400 further comprises performing 409 an activity, such as for example controlling a vehicle, based at least in part on at least one of: an output of the second detection model or, an output from the first detection model. For example, in case both models output a classification, such outputs may be compared to determine the activity as described above and will be further described in conjunction with FIG. 4B below. In examples, the activity may comprise generating instructions to control a vehicle based at least in part on least in part on at least one of: an output of the second detection model, and an output from the first detection model. In case only the second detection model outputs a classification, the activity performed may be based at least in part on that classification, generating instructions to control a vehicle based at least in part on least in part on an output of the second detection model.

Figure 4B:
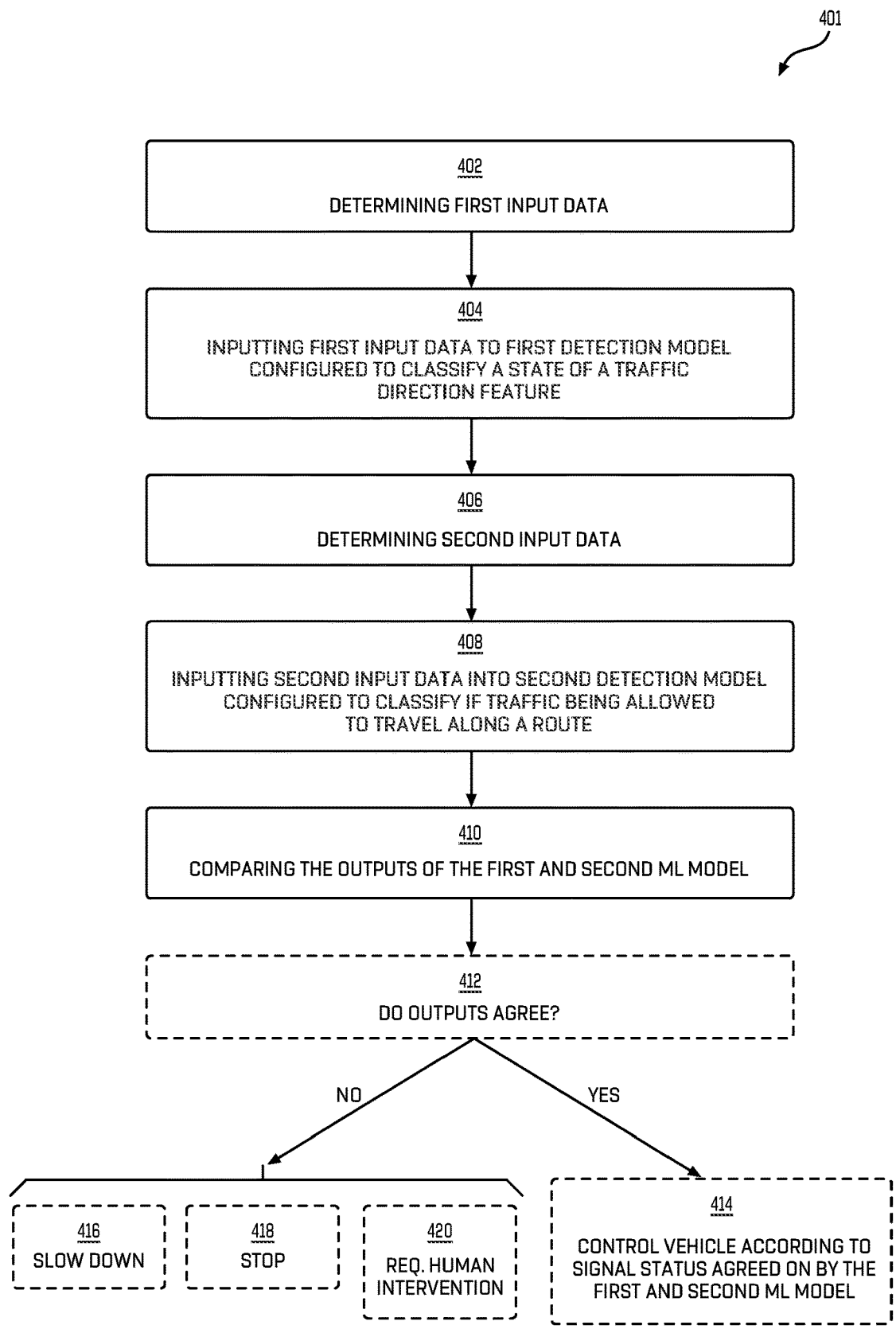

FIG. 4b depicts a flow chart of an example traffic direction classification process 401. The process may be embodied by a computer-implemented method, or as instructions stored by one or more non-transitory computer-readable media, wherein the instructions, when executed, cause one or more processors to perform operations as exemplified in FIG. 4b. FIG. 4b comprises the same initial steps 402-408 as FIG. 4a and shows examples of activities performed based at least in part on at least one of: an output of the second detection model, and an output from the first detection model. In case the first detection model outputs a classification, the process 401 may comprise comparing 410 the outputs to determine a difference between the output of the first detection model and the output of the second detection model. In examples, the process 401 continues by determining 412 whether the outputs agree or disagree. In case the outputs agree, the process 401 may comprise controlling 414 a vehicle according to the signal status agreed on by the first and second detection model. In examples, agreeing outputs comprises the classification pairs of "red"—"traffic not allowed to enter junction" and "green"—"traffic allowed to enter junction", and similar classification pairs.

In case the outputs disagree, the process 401 may comprise generating instructions to control a vehicle, wherein the instructions comprise one of: stop 418 the vehicle, slow down 416 the vehicle, and dispatch a request 420 for human intervention to control the vehicle.

The person skilled in the art realizes that the disclosure by no means is limited to the order of the steps in the exemplary embodiment of the process 400 described above. On the contrary, variations are possible within the scope of the appended claims. The step of determining 402 first input data and determining 406 second input data may be done in a different order or in parallel. The first and second detection model may be run on the respective input data in any order or in parallel.

Additional Example Vehicle System

Figure 5:
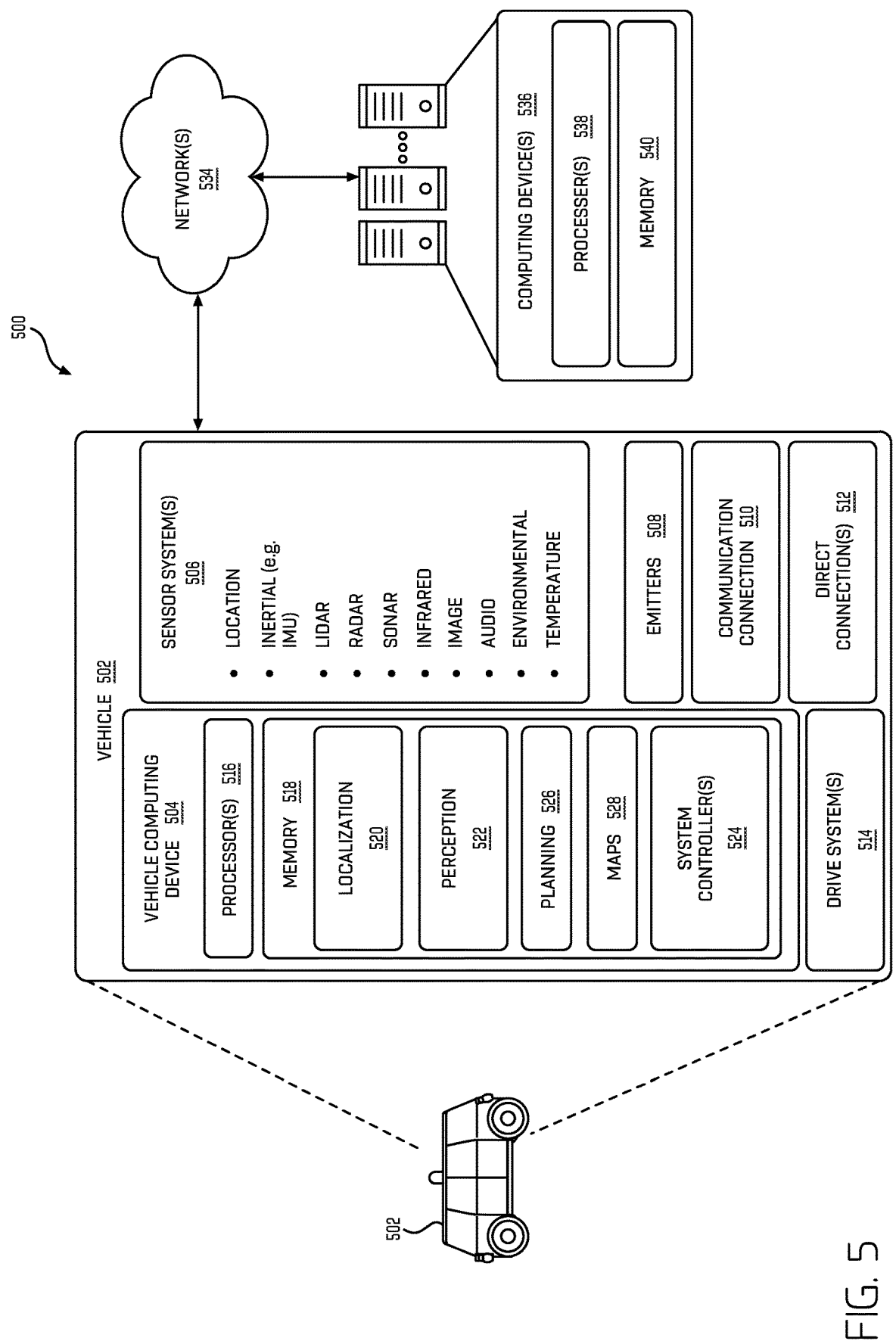
FIG. 5 depicts a block diagram of an example vehicle system.

A further example of a vehicle system 500 is depicted in FIG. 5. The vehicle system 500 includes a vehicle 502, and may be any of the vehicles 102 or 206 of FIGS. 1-3. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification. Moreover, in some instances, the techniques described herein may be usable in conjunction with non-autonomous vehicles as well.

The vehicle 502 may include vehicle computing device(s) 504, one or more sensor systems 506, one or more communication connections 510, at least one direct connection 512 (e.g., for physically coupling the vehicle 502 to exchange data and/or to provide power), and one or more drive systems 514.

In some instances, the sensor(s) 506 (referred to as 118 and 120 in FIG. 1) may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 506 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and may in particular provide measurements relating to a signal status of a traffic light heads and objects and their respective movement states from which a signal status of a traffic light head may be inferred as described in this disclosure.

The vehicle computing device(s) 504 may include one or more processors 516 and memory 518 communicatively coupled with the one or more processors 516. In the illustrated example, the memory 518 of the vehicle computing device(s) 504 stores a localization component 520, a perception component 522, a planning component 526, one or more maps 528 (such as maps 208 in FIGS. 2-3), one or more system controllers 524, and a safety system 530. Though depicted in FIG. 5 as residing in memory 520 for illustrative purposes, it is contemplated that the localization component 520, perception component 522, planning component 526, safety system 530 and/or the one or more maps 528 may be accessible to the vehicle 502 (e.g., stored on, or otherwise accessible by, memory remote from the vehicle 502).

An example of this remote memory is the computing device 536. The computing device 536 may include one or more processors 538 and memory 540. Although not depicted here, in some instances the computing device 536 may store the above-referenced components and controllers. The processor 516 may access these as required from the computing device 536 via the network 514 that connects the vehicle 502 and the computing device 536.

In some examples, the vehicle 502 may send operational data, including raw or processed sensor data from the sensor system(s) 506, to one or more computing device(s) 516 via the network(s) 514.

In some instances, the perception component 522 may include functionality to perform object detection, segmentation, and/or classification, and output from the perception component may for example used as input or basis for input to a machine learning model described above in conjunction with FIGS. 1-4. In some examples, the perception component 522 may provide processed sensor data that indicates a presence of an entity that is proximate to the vehicle 502 and/or a classification of the entity as an entity type (e.g., car, pedestrian, cyclist, animal, traffic light, building, tree, road surface, curb, sidewalk, unknown, etc.). In additional or alternative examples, the perception component 522 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 502 may provide the data relating to the objects in the environment as inputs to a perception component of the vehicle computing device, such as perception component 522. The perception component may use the data to perform object detection, segmentation, classification, and other data processing to determine characteristics about the objects.

The perception component 522 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 526 or localization component such as localization component 520, or from a remote device, such as remote computing device 536. In some examples, the data may comprise map data received from the maps 528 or the other components in memory.

The data gathered may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 5, the data may be transferred from the perception component 522 to other software components stored in the memory 518 of the vehicle, such as the localization component 520 or planning component 526. In some instances, the data may be transferred from the perception component 522 to the remote computing device 536 via the communication connection 510 and network 534.

The localization component 520 may be configured to receive data from the sensor system(s) 506 to determine a position and/or orientation of the vehicle 502 (e.g., one or more of an x-, y-, z-position, roll, pitch, or yaw). For example, the localization component 520 may include and/or request/receive a map 528 of an environment and may continuously determine a location and/or orientation of the autonomous vehicle within the map 528.

In at least one example, the planning component 526 may determine a location of a user based on image data of an environment received from the user using, for example, bags of binary words with image-based features, artificial neural network, and the like. Further, the planning component 526 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 502 may stop to pick up a passenger. In at least one example, the planning component 526 may determine a pickup location based at least in part on determining a user identity (e.g., determined via image recognition or received as an indication from a user device, as discussed herein).

A communication connection 510 may enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 508 may additionally or alternatively allow the vehicle 502 to communicate with other nearby computing device(s) (e.g., other nearby vehicles, traffic signals, etc.). The communication connection(s) 510 may additionally or alternatively enable the vehicle 502 to communicate with a computing device 536. The computing device 536 may be at a remote location from the vehicle and the vehicle may communication with the computing device 536 over a network 514.

It will be appreciated that data usable for inferring a state of a traffic direction feature in the environment is used as an example in FIGS. 1-4 but that any data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 502, map data may be transferred from the one or more maps 528 of the vehicle memory 518 to the localization or planning components 520, 526. In some examples, data may be transferred from the planning component 526 to the system controller 524 and/or one or more emitters 508. In some examples, data may be transferred from the system controller 524 to one or more drive systems 514.

The maps 528 may be used by the vehicle 502 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 528 may have similar memory requirements, but increase the speed at which data in a map may be accessed. As discussed herein, the maps 528 may further indicate the known locations of traffic lights and may be used by the perception 522 to identify known traffic lights in measurements captured by the sensor system(s) 506.

The system controller 524 may be configured to control steering, propulsion, braking, safety, emitters, communication, and other systems of the vehicle 502. The system controller(s) 524 may communicate with and/or control corresponding systems of the drive system(s) 514 and/or other components of the vehicle 502. The system controller(s) 524 may be communicatively coupled to one or more sensors of the vehicle sensor system(s) 506.

Emitter(s) 508 may be provided for emitting light and/or sound, and may include interior emitters to communicate with passengers of the vehicle 502 and/or exterior emitter(s) to communicate with pedestrians or other nearby vehicles.

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 520, 540 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

EXAMPLE CLAUSES

A: A system comprising: one or more processors; and one or more non-transitory computer-readable media storing computer executable instructions that, when executed by the one or more processors, cause the system to perform actions comprising: receiving, from a camera of a vehicle, an image of a traffic light head associated with a junction associated with a path of the vehicle; determining first input data based at least in part on the image; inputting the first input data into a first detection model configured to classify a signal status of the traffic light head; receiving sensor data from a sensor of the vehicle relating to a movement state of an object external to the vehicle; determining second input data based at least in part on the sensor data; inputting the second input data into a second detection model configured to classify a first class corresponding to traffic of the road being allowed to enter the junction wherein the traffic is associated with movement of objects in relation to the junction, and a second class corresponding to traffic of the road not being allowed to enter the junction; determining a difference between an output of the first detection model and an output of the second detection model; and controlling an operation of the vehicle, based at least in part on the difference.

B. The system according to clause A, wherein the first detection model is configured to output an indication of certainty relating to a classification made by the first detection model, wherein the second detection model is configured to output an indication of certainty relating to a classification made by the second detection model.

C. The system according to any of clauses A-B, wherein the instructions further cause the system to perform actions comprising: determining a first indication of reliability of the output of the first detection model and a second indication of reliability of the output of the second detection model, the first and second indication of reliability based at least in part on conditions of an environment being traversed by the vehicle; controlling an operation of the vehicle, based at least in part on the first indication of reliability and the second indication of reliability.

D. The system according to any of clauses A-C, wherein the instructions further cause the system to perform actions comprising: receiving second sensor data relating to a distance from the vehicle to the junction; controlling an operation of the vehicle, based at least in part on the second sensor data.

E. The system according to any of clauses A-C, wherein the instructions further cause the system to perform actions comprising: receiving a time ordered sequence of sensor data from the sensor of the vehicle relating to the movement state of the object during a time period; determining the second input data based at least in part on the time ordered sequence of sensor data.

F. The system according any of clauses A-E, wherein the second input data corresponds to a top-down view or a vectorized representation of an environment being traversed by the vehicle.

G. A computer-implemented method comprising: determining first input data from imaging data; inputting the first input data into a first detection model configured to classify a state of a traffic directing feature detectable in the first input data; determining second input data based at least in part of first sensor data from a first sensor, the first sensor data indicating a movement state of an object; inputting the second input data into a second detection model configured to classify a first class corresponding to traffic being allowed to travel along a route, and a second class corresponding to traffic not being allowed to travel along a route; and controlling a vehicle based at least in part on at least one of: an output of the second detection model or, an output from the first detection model.

H. The computer-implemented method of clause G, wherein the first detection model is configured to determine the state of the traffic directing feature based at least in part on map data and wherein the vehicle is controlled based at least in part on a determination that the traffic differs from traffic defined by the map data.

I: The computer-implemented method of any of clauses G-H, wherein the first detection model outputs a classification of a state of a traffic directing feature detected in the first input data, the method further comprising determining a difference between the output of the first detection model and the output of the second detection model.

J. The computer-implemented method of clause I, further comprising determining that the difference exceeds a threshold, and marking the imaging data for human labeling of the state of the traffic routing feature.

K. The computer-implemented method of any of clauses I-J, further comprising determining that the difference exceeds a threshold, and generating instructions to control a vehicle, wherein the instructions comprise one of: stop the vehicle, slow down the vehicle, and dispatch a request for human intervention to control the vehicle.

L. The computer-implemented method of any of clauses G-K, wherein the first detection model is trained to output a first indication of certainty relating to a classification made by the first detection model, wherein the second detection model is trained to output a second indication of certainty relating to a classification made by the second detection model, wherein the first indication of certainty is higher than the second indication of certainty and a classification related to the first indication of certainty is prioritized over a classification related to the second indication of certainty when comparing the output of the first detection model with the output of the second detection model.

M. The computer-implemented method of any of clauses G-L, wherein the first detection model is trained to output a first indication of certainty relating to a classification made by the first detection model, wherein the second detection model is trained to output a second indication of certainty relating to a classification made by the second detection model, wherein the first indication of certainty is lower than the second indication of certainty and a classification related to the second indication of certainty is prioritized over a classification related to the first indication of certainty when comparing the output of the first detection model with the output of the second detection model.

N. The computer-implemented method of any of clauses G-M, further comprising receiving the imaging data and the first sensor data from historical data.

O. The computer-implemented method of any of clauses K-M, further comprising adjusting a quality metric of at least one of the first detection model and the second detection model based at least in part on the comparison.

P. The computer-implemented method of any of clauses K-M, further comprising determining a first indication of reliability of the output of the first detection model and a second indication of reliability of the output of the second detection model, generating instructions to control a vehicle based at least in part on the comparison and the indication of reliability, wherein the first indication of reliability is higher than the second indication of reliability and a classification relating to the first indication of reliability is prioritized over a classification relating to the second indication of reliability when generating the instructions.

Q. The computer-implemented method of any of clauses K-M, further comprising determining a first indication of reliability of the output of the first detection model and a second indication of reliability of the output of the second detection model, generating instructions to control a vehicle based at least in part on the comparison and the indication of reliability, wherein the first indication of reliability is lower than the second indication of reliability and a classification relating to the second indication of reliability is prioritized over a classification relating to the first indication of reliability when generating the instructions.

R. The computer-implemented method of any of clauses G-Q, wherein the second input data corresponds to a top-down view or a vectorized representation of an environment being traversed by the vehicle.

S. The computer-implemented method of any of clauses G-R, further comprising receiving second sensor data relating to a distance from a vehicle to the junction; controlling an operation of the vehicle, based at least in part on the second sensor data.

T. The computer-implemented method of any of clauses G-S, wherein the traffic direction feature is controlling traffic flow through a junction.

U. The computer-implemented method of any of clauses G-T, further comprising: receiving a time ordered sequence of sensor data relating to the movement state of the object during a time period; determining the second input data based at least in part on the time ordered sequence of sensor data.

V. One or more non-transitory computer-readable media storing instructions executable by one or more processors, wherein the instructions, when executed, cause the one or more processors to perform operations comprising: determining first input data from imaging data; inputting the first input data into a first detection model configured to classify a state of a traffic directing feature detectable in the first input data; determining second input data based at least in part of first sensor data from a first sensor, the first sensor data indicating a movement state of an object; inputting the second input data into a second detection model configured to classify a first class corresponding to traffic being allowed to travel along a route, and a second class corresponding to traffic not being allowed to travel along a route; and controlling a vehicle based at least in part on at least one of: an output of the second detection model or, an output from the first detection model.

X. The one or more non-transitory computer-readable media of clause V, wherein the first detection model is configured to determine the state of the traffic direction feature based at least in part on map data and wherein the vehicle is controlled based at least in part on a determination that the traffic differs from traffic defined by the map data.

Y: The one or more non-transitory computer-readable media of any of one of clauses V-X, wherein the first detection model outputs a classification of a state of a traffic directing feature detected in the first input data, wherein the operations further comprise: determining a difference between the output of the first detection model and the output of the second detection model.

Z. The one or more non-transitory computer-readable media of clause Y, wherein the operations further comprise determining that the difference exceeds a threshold, and marking the imaging data for human labeling of the state of the traffic routing feature.

AA. The one or more non-transitory computer-readable media of any of clauses Y-Z, wherein the operations further comprise determining that the difference exceeds a threshold, and generating instructions to control a vehicle, wherein the instructions comprise one of: stop the vehicle, slow down the vehicle, and dispatch a request for human intervention to control the vehicle.

AB. The one or more non-transitory computer-readable media of any of clauses Y-AA, wherein the first detection model is trained to output a first indication of certainty relating to a classification made by the first detection model, wherein the second detection model is trained to output a second indication of certainty relating to a classification made by the second detection model, wherein the first indication of certainty is higher than the second indication of certainty and a classification related to the first indication of certainty is prioritized over a classification related to the second indication of certainty when comparing the output of the first detection model with the output of the second detection model.

AC. The one or more non-transitory computer-readable media of any of clauses Y-AB, wherein the first detection model is trained to output a first indication of certainty relating to a classification made by the first detection model, wherein the second detection model is trained to output a second indication of certainty relating to a classification made by the second detection model, wherein the first indication of certainty is lower than the second indication of certainty and a classification related to the second indication of certainty is prioritized over a classification related to the first indication of certainty when comparing the output of the first detection model with the output of the second detection model.

AD. The one or more non-transitory computer-readable media of any of clauses V-AC, wherein the operations further comprise: receiving the imaging data and the first sensor data from historical data.

AE. The one or more non-transitory computer-readable media of any of clauses Y-AD, wherein the operations further comprise: adjusting a quality metric of at least one of the first detection model and the second detection model based at least in part on the comparison.

AF. The one or more non-transitory computer-readable media of any of Y-AE, wherein the operations further comprise: determining a first indication of reliability of the output of the first detection model and a second indication of reliability of the output of the second detection model, generating instructions to control a vehicle based at least in part on the comparison and the indication of reliability, wherein the first indication of reliability is higher than the second indication of reliability and a classification relating to the first indication of reliability is prioritized over a classification relating to the second indication of reliability when generating the instructions.

AG. The one or more non-transitory computer-readable media of any of Y-AF, wherein the operations further comprise: determining a first indication of reliability of the output of the first detection model and a second indication of reliability of the output of the second detection model, generating instructions to control a vehicle based at least in part on the comparison and the indication of reliability, wherein the first indication of reliability is lower than the second indication of reliability and a classification relating to the second indication of reliability is prioritized over a classification relating to the first indication of reliability when generating the instructions.

AH. The one or more non-transitory computer-readable media of any of clauses V-AG, wherein the second input data corresponds to a top-down view or a vectorized representation of an environment being traversed by the vehicle.

AI. The computer-implemented method of any of clauses V-AH, further comprising receiving second sensor data relating to a distance from a vehicle to the junction; controlling an operation of the vehicle, based at least in part on the second sensor data.

AJ. The one or more non-transitory computer-readable media of any of clauses V-AI, wherein the traffic direction feature is controlling traffic flow through a junction.

AK. The one or more non-transitory computer-readable media of any of clauses V-AI, wherein the operations further comprise: receiving a time ordered sequence of sensor data relating to the movement state of the object during a time period; determining the second input data based at least in part on the time ordered sequence of sensor data.

While the example clauses described above are described with respect to one particular implementation, it should be understood that, in the context of this document, the content of the example clauses can also be implemented via a method, device, system, computer-readable medium, and/or another implementation. Additionally, any of examples A-AK may be implemented alone or in combination with any other one or more of the examples A-AK

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer executable instructions that, when executed by the one or more processors, cause the system to perform actions comprising:
receiving, from a camera of a vehicle, an image of a traffic light head associated with a junction associated with a path of the vehicle;
determining first input data based at least in part on the image;
inputting the first input data into a first detection model configured to classify a signal status of the traffic light head;
receiving sensor data from a sensor of the vehicle relating to a movement state of an object external to the vehicle;
determining second input data based at least in part on the sensor data data, the second input data corresponding to a multi-channel top-down view or a graph representation of an environment being traversed by the vehicle, the graph representation associated with a graph neural network (GNN);
inputting the second input data into a second detection model, the second detection model comprising a machine-learned classifier configured to classify a first class corresponding to traffic of the road being allowed to enter the junction wherein the traffic is associated with movement of objects in relation to the junction, and a second class corresponding to traffic of the road not being allowed to enter the junction;
determining a difference between an output of the first detection model and an output of the second detection model; and
controlling an operation of the vehicle, based at least in part on the difference.

2. The system according to claim 1, wherein the first detection model is configured to output an indication of certainty relating to a classification made by the first detection model, wherein the second detection model is configured to output an indication of certainty relating to a classification made by the second detection model.

3. The system according to claim 1, wherein the instructions further cause the system to perform actions comprising:
determining a first indication of reliability of the output of the first detection model and a second indication of reliability of the output of the second detection model, the first and second indication of reliability based at least in part on conditions of an environment being traversed by the vehicle;
controlling an operation of the vehicle, based at least in part on the first indication of reliability and the second indication of reliability.

4. The system according to claim 1, wherein the instructions further cause the system to perform actions comprising:
receiving a time ordered sequence of sensor data from the sensor of the vehicle relating to the movement state of the object during a time period;
determining the second input data based at least in part on the time ordered sequence of sensor data.

5. A computer-implemented method comprising:
determining first input data from imaging data;
inputting the first input data into a first detection model configured to classify a state of a traffic directing feature detectable in the first input data;
determining second input data based at least in part on first sensor data from a first sensor, the first sensor data indicating a movement state of an object object, the second input data corresponding to a multi-channel top-down view or a graph representation of an environment, the graph representation associated with a graph neural network (GNN);
inputting the second input data into a second detection model, the second detection model comprising a machine-learned classifier configured to classify a first class corresponding to traffic being allowed to travel along a route, and a second class corresponding to traffic not being allowed to travel along a route; and
controlling a vehicle based at least in part on at least one of: an output of the second detection model or an output from the first detection model.

6. The computer-implemented method of claim 5, wherein the first detection model is configured to determine the state of the traffic directing feature based at least in part on map data and wherein the vehicle is controlled based at least in part on a determination that the traffic differs from traffic defined by the map data.

7. The computer-implemented method of claim 5, wherein the first detection model outputs a classification of a state of a traffic directing feature detected in the first input data, the method further comprising:
    determining a difference between the output of the first detection model and the output of the second detection model.

8. The computer-implemented method of claim 7, further comprising
    determining that the difference exceeds a threshold, and
    marking the imaging data for human labeling of the state of the traffic directing feature.

9. The computer-implemented method of claim 7, further comprising
    determining that the difference exceeds a threshold, and
    generating instructions to control a vehicle, wherein the instructions comprise one of: stop the vehicle, slow down the vehicle, and dispatch a request for human intervention to control the vehicle.

10. The computer-implemented method of claim 7, further comprising
    determining a first indication of reliability of the output of the first detection model and a second indication of reliability of the output of the second detection model,
    generating instructions to control a vehicle based at least in part on the comparison and the indication of reliability, wherein the first indication of reliability is higher than the second indication of reliability and a classification relating to the first indication of reliability is prioritized over a classification relating to the second indication of reliability when generating the instructions.

11. The computer-implemented method of claim 5, wherein the traffic directing feature is controlling traffic flow through a junction.

12. The computer-implemented method of claim 5, further comprising:
    receiving a time ordered sequence of sensor data relating to the movement state of the object during a time period;
    determining the second input data based at least in part on the time ordered sequence of sensor data.

13. One or more non-transitory computer-readable media storing instructions executable by one or more processors, wherein the instructions, when executed, cause the one or more processors to perform operations comprising:
    determining first input data from imaging data;
    inputting the first input data into a first detection model configured to classify a state of a traffic directing feature detectable in the first input data;
    determining second input data based at least in part on first sensor data from a first sensor, the first sensor data indicating a movement state of an object, the second input data corresponding to a multi-channel top-down view or a graph representation of an environment, the graph representation associated with a graph neural network (GNN);
    inputting the second input data into a second detection model, the second detection model comprising a machine-learned classifier configured to classify a first class corresponding to traffic being allowed to travel along a route, and a second class corresponding to traffic not being allowed to travel along a route; and
    controlling a vehicle based at least in part on at least one of: an output of the second detection model or, an output from the first detection model.

14. The one or more non-transitory computer-readable media of claim 13, wherein the first detection model is configured to determine the state of the traffic directing feature based at least in part on map data and wherein the vehicle is controlled based at least in part on a determination that the traffic differs from traffic defined by the map data.

15. The one or more non-transitory computer-readable media of claim 13, wherein the first detection model outputs a classification of a state of a traffic directing feature detected in the first input data, the method further comprising:
    determining a difference between the output of the first detection model and the output of the second detection model.

16. The one or more non-transitory computer-readable media of claim 15, wherein the operations further comprise:
    determining that the difference exceeds a threshold, and
    marking the imaging data for human labeling of the state of the traffic directing feature.

17. The one or more non-transitory computer-readable media of claim 15, wherein the operations further comprise:
    determining that the difference exceeds a threshold, and
    generating instructions to control a vehicle, wherein the instructions comprise one of: stop the vehicle, slow down the vehicle, and dispatch a request for human intervention to control the vehicle.

18. The one or more non-transitory computer-readable media of claim 15, wherein the operations further comprise:
    determining a first indication of reliability of the output of the first detection model and a second indication of reliability of the output of the second detection model,
    generating instructions to control a vehicle based at least in part on the comparison and the indication of reliability, wherein the first indication of reliability is higher than the second indication of reliability and a classification relating to the first indication of reliability is prioritized over a classification relating to the second indication of reliability when generating the instructions.

19. The one or more non-transitory computer-readable media of claim 13, wherein the operations further comprise:
    receiving a time ordered sequence of sensor data relating to the movement state of the object during a time period;
    determining the second input data based at least in part on the time ordered sequence of sensor data.

* * * * *